United States Patent
Koga et al.

[15] 3,661,260
[45] May 9, 1972

[54] CONTINUOUS SLURRY SEPARATION

[72] Inventors: Michio Koga; Kiyobumi Ando, both of Yokkaichi, Japan

[73] Assignee: Mitsubishi Petrochemical Company Limited, Tokyo-to, Japan

[22] Filed: May 6, 1970

[21] Appl. No.: 35,100

[30] Foreign Application Priority Data

May 14, 1969 Japan..................................44/36579

[52] U.S. Cl..................................210/74, 210/83, 210/110, 210/175
[51] Int. Cl........................................................B01d 21/10
[58] Field of Search................210/74, 83, 97, 104, 110, 175, 210/187

[56] References Cited

UNITED STATES PATENTS

| | | | |
|---|---|---|---|
| 2,338,986 | 1/1944 | Waterman | 210/74 |
| 3,196,141 | 7/1965 | Bradford | 210/83 X |
| 3,416,667 | 12/1968 | Cabbage | 210/104 |

Primary Examiner—Jim L. De Cesare
Attorney—Robert E. Burns and Emmanuel J. Lobato

[57] ABSTRACT

A mixture of an oil slurry phase and an aqueous phase is continuously supplied into a tower constituting a separation chamber and is retained in it for a time to stratify into respective upper and lower layers, from which the slurry and aqueous phase, respectively, are continuously drawn off and a portion of the drawn-off slurry is tapped and continuously discharged as a slurry product, while the remainder is continuously recirculated to the upper-layer slurry in the chamber. The mixture supply, slurry product discharge, and aqueous phase drawoff are so controlled as to establish and maintain a flow-continuity equilibrium in the chamber whereby the retained quantities of the slurry and aqueous phase are maintained constant.

8 Claims, 2 Drawing Figures

PATENTED MAY 9 1972    3,661,260

CONTINUOUS SLURRY SEPARATION

BACKGROUND OF THE INVENTION

This invention relates generally to techniques in separating fluid substances and more particularly to a new method and apparatus for continuously separating a process mixture into an oil slurry phase and an aqueous phase.

In chemical industry, there are instances wherein it is necessary to process mixtures each composed of an oil slurry phase disposed as an upper layer and an aqueous phase disposed as a lower layer when left standing and caused to settle. For example, in some cases in the process of producing a polyolefin, it is necessary to separate a process mixture into an oil slurry phase composed of a hydrocarbon slurry in which a polyolefin is suspended and an aqueous phase.

Such a separation in a continuous manner is not easy in many cases. The reason for this is that, while it should be possible to separate the light oil phase and the heavy aqueous phase by leaving the mixture thereof at rest to settle for a certain time, a problem arises on this point in the case where a slurry is being processed.

More specifically, the specific densities of the dispersed phase and the dispersing medium within an oil slurry phase are different in many instances. For example, in a polyolefin slurry, the specific gravity of the dispersed phase, namely the polyolefin, is of the order of from 0.8 to 1.0 while that of the hydrocarbon dispersing medium is of the order of from 0.6 to 0.8. Consequently, when the mixture is left standing for an amply long settling time, sedimentation of the polyolefin occurs. On the other hand, when the settling time is shortened, or the oil slurry phase is agitated, the separation of the two phases becomes incomplete.

In the separation of an oil slurry phase and an aqueous phase, control of the interface also poses a problem. For separating a mixture of these two phases, it is necessary to stratify both phases. In the case where separation of the oil slurry phase is carried out continuously, it is particularly necessary that the position of the interface between the two phases be placed fully under the control of the operator.

While the interface position during separation of immiscible liquids can be detected by means of a float-type interface detecting device, there has been no suitable technique to date for detecting the interface between an immiscible slurry phase and a liquid phase as in mixtures to be processed in accordance with the invention. Accordingly, it has been the ordinary practice heretofore to resort to a batch process for separation of a mixture of an oil slurry phase and an aqueous phase into the two phases.

SUMMARY OF THE INVENTION

It is an object of the present invention to overcome the above described difficulties in providing a practical and simple method and apparatus for continuous separation of oil slurry phases.

According to the present invention, briefly summarized, there is provided, in the separation of a slurry from a mixture of an oil slurry phase and an aqueous phase which stratify into respective and contiguous upper and lower layers when left standing at rest, a method characterized by the steps of introducing the mixture continuously into a tower-type separation chamber, causing the mixture to be retained for a certain time therein to stratify into the upper and lower layers, and continuously drawing off slurry from the upper layer and aqueous phase from the lower layer in a manner to maintain a state of dynamic equilibrium within the chamber as a portion of the slurry thus drawn off is continuously discharged as a slurry product and the remainder of the drawn off slurry is recirculated into the upper-layer slurry phase within the chamber.

According to the present invention in another aspect thereof, there is provided an apparatus for carrying out the above stated method for continuous slurry separation.

The nature, principle, and utility of the invention will be more clearly apparent from the following detailed description beginning with general considerations and concluding with a specific example of practice illustrating a preferred embodiment of the invention when read in conjunction with the accompanying drawing, in which like parts are designated by the reference numerals.

DETAILED DESCRIPTION

In accordance with the invention as mentioned hereinbefore, the dynamic equilibrium state within a separation chamber is so maintained that there is substantially no fluctuation of an interface between an oil slurry phase and an aqueous phase, and the slurry phase is recirculated to aid the prevention of sedimentation of the dispersed phase within the oil slurry phase (hereinafter referred to as the slurry phase) thereby to make possible continuous separation, which has heretofore been difficult.

Figure 1:
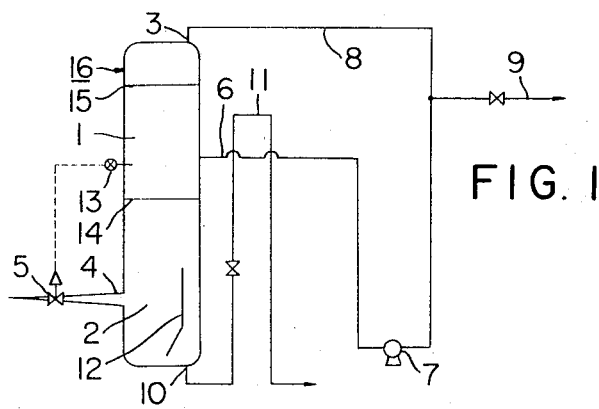
FIG. 1 is a diagrammatic flow-chart of the principle of the invention.

The principle of the invention will now be considered with respect to one example of apparatus diagrammatically indicated in FIG. 1, in which a separation chamber 16 is used and contains an aqueous phase 2 constituting a lower layer and a slurry phase 1 constituting an upper layer above the aqueous phase with an interface 14 therebetween.

The separation chamber 16 is provided with a slurry phase draw-off outlet 6 connected to the chamber in the region thereof containing the upper-layer slurry phase 1. An aqueous phase draw-off outlet 10 is connected to the bottom of the chamber. A supply inlet 4 is provided for supplying into the chamber a mixture of slurry and aqueous phases, and a slurry phase recirculation line 8 is connected to the top of the chamber.

While the recirculation of the upper-layer slurry phase is a unique and prominent feature in the practice of the present invention as a process, it is not absolutely necessary to carry out independently and separately the drawing off of the upper-layer slurry phase for this recirculation and the discharging of the upper-layer slurry phase as a slurry product. That is, it is not necessary to provide a slurry phase draw-off outlet in the separation chamber for each of these purposes.

Accordingly, the discharging of the slurry product may be carried out from the slurry recirculation system or circuit as indicated in FIG. 1, or, alternatively, a portion of the slurry may be diverted from a pipe line for discharging the slurry product and returned to the separation chamber thereby to form a slurry-recirculation system (the slurry phase draw-off outlet confronting the upper-layer slurry phase being of one kind in each of these two cases).

We have found that, for preventing clogging due to sedimentation and accumulation of the dispersed phase within the slurry phase 1, an appropriate control step is to hold the slurry rising linear velocity from the interface 14 formed between the two phases after stratification to the slurry phase draw-off outlet 6 in a range of from 0.05 to 3 cm./sec. For this purpose of controlling the slurry rising linear velocity, the use of a separation chamber 16, of the vertically-long tower type, is suitable and convenient.

The term "tower type" is used herein to designate a separation chamber of a shape such that its height is substantially greater than its diameter or largest cross-sectional dimension or the square root of its cross-sectional area. Provided that these conditions are fulfilled, the cross section of the tower-type separation chamber 16 may be of any convenient shape such as an ellipse or polygon in addition to a circle.

Furthermore, the "tower" need not be of the same diameter from its upper part to its lower part. For example, for prolonging the residence time (or retention time) of the aqueous phase, the chamber diameter of at least the lower part of the region in which the aqueous phase 2 resides can be made greater than the chamber diameter of the region in which the slurry phase 1 resides, as illustrated by one specific example in FIG. 2.

We have found that the mixture supply inlet 4 is preferably provided at a level at least 0.5 of a meter below the interface 14 so as not to cause undue disturbance of the interface and thereby to prevent admixing of the aqueous phase into the slurry phase. While a suitable position for the supply inlet 4 depends on the rate of supply of the mixture, it is desirable in many cases that this inlet be positioned at least 0.8 of a meter below the interface, a suitable range being of the order of from 1.0 to 3.5 meters. A distance greater than 5 meters is probably economically disadvantageous because the total tower height would become unnecessarily great.

It is desirable that the diameter of the supply inlet 4 be so selected that the linear velocity of supply of the mixture of the two phases will be of the order of from 0.1 to 20 cm./sec. As long as the supply speed is within this range, the separation of the slurry and aqueous phases can be accomplished with a compact apparatus. More specifically, when this supply speed is excessively high, it is necessary to use a separation chamber having a part for the aqueous phase 2 of an unnecessarily large volume in order to avoid disturbance of the interface and thereby to prevent admixture of the slurry phase into the discharged aqueous phase.

Accordingly, a supply inlet 4 formed in the shape of a hollow cone, diverging away from the tower as indicated in FIG. 1 to lower the supply linear speed is desirable. For the same reason, it is also advantageous to make the chamber diameter at its part containing the aqueous phase 2, particularly in the vicinity of the supply inlet 4, greater than that of the part of the slurry phase 1. It will be apparent that, instead of the single supply inlet 4 illustrated in FIG. 1, a plurality of supply inlets may be used.

We have found that the height of the slurry-phase draw-off outlet 6 is desirably at least 0.3 of a meter above the interface 14. In general, a value of this height of at least 0.5 of a meter is preferable in many cases. If this height is too short, there will be the possibility of the aqueous phase becoming admixed in large quantity into the slurry being drawn off. On the other hand, it is desirable that this height be limited to 1.5 meters in order to limit fully the sedimentation of the dispersed phase within the slurry phase.

Figure 2:
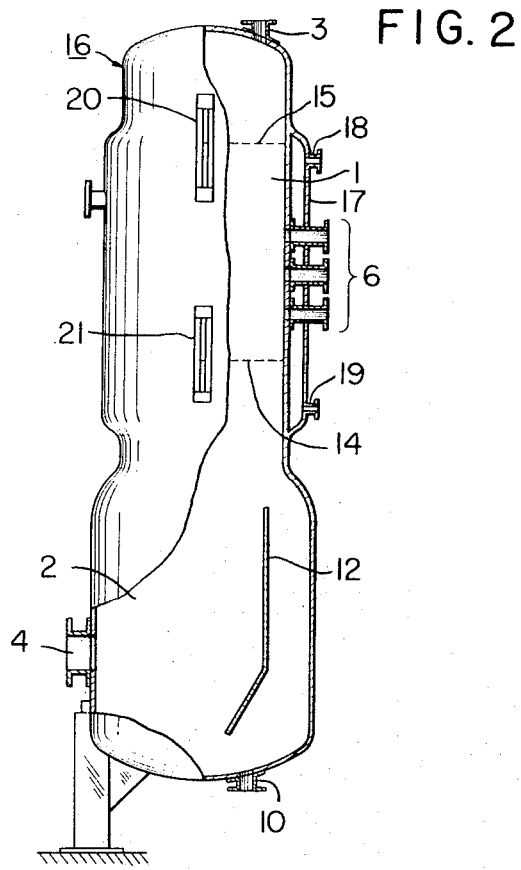
FIG. 2 is an elevation view, partly in vertical section and with parts cut away, showing a specific example of a separation chamber of an apparatus for carrying out the method of the invention.

Generally stated, the slurry-phase draw-off outlet 6 is preferably disposed from 0.5 to 1.5 meters above the interface 14. When a plurality of slurry-phase draw-off outlets are used in the separation chamber 16 to draw off the upper-layer slurry phase, as shown in FIG. 2, this height condition is preferably applicable to each of the outlets.

Recirculation of the slurry phase is necessary for suppressing sedimentation of the dispersed phase within the slurry phase 1 and, in the specific example illustrated in FIG. 1, for drawing off slurry phase to become the process product. The slurry-phase recirculation is accomplished by means of a pump 7 through the slurry-phase recirculation line 8 preferably at a flowrate such that a quantity of slurry which is from 5 to 100 times the volume of the upper-layer slurry phase 1 present in the separation chamber 16 under a state of dynamic equilibrium passes through the outlet 6 every hour.

With a flowrate corresponding to less than five times the volume of the slurry phase 1, the suppression of the sedimentation of the dispersed phase within the slurry phase is insufficient. On the other hand, a flowrate corresponding to more than 100 times the volume of the slurry phase 1 gives rise to a violent flow of the slurry phase 1 and a great disturbance of the interface 14 and slurry-phase surface 15, whereby the process operation becomes unstable. While the inlet for introducing the recirculated slurry phase may be above or below the slurry-phase surface 15, it should be positioned well above the slurry draw-off outlet 6. An empty space 3 of a height of the order of 1 meter above the slurry-phase surface 15 has been found to be suitable.

The draw-off outlet 10 for draining the aqueous phase 2 is provided below the interface 14 in the side wall of the separation chamber 16 or in the bottom thereof. In order to prevent admixture of the slurry phase supplied through the supply inlet 4, the aqueous-phase draw-off outlet 10 is preferably positioned below the supply inlet 4, for example, in the bottom of the separation chamber 16 as indicated in FIG. 1. In addition, the provision of a baffle plate 12 is also desirable.

The aqueous phase drained out of the separation chamber 16 through the outlet 10 can be conveniently discharged in an automatic manner by means of an overflow pipe 11 as shown in FIG. 1, utilizing a hydrostatic head corresponding to the difference between the heights of the top of the overflow pipe and the slurry-phase surface 15. Discharging by means of a pump is, of course, also possible.

The process operation of the present invention is carried out in a manner such that a state of dynamic equilibrium is sustained within the separation chamber. Such an operation can be accomplished by effecting process control so that the rates of feed of the slurry phase and the aqueous phase supplied as a mixture are substantially equal to the rate of discharging of the slurry product and the rate of aqueous-phase drawoff, respectively. In this operation, it is preferable that fluctuations of the level of the interface 14 between the two phases 1 and 2 be held within a range of ±10 cm.

While a control of such a nature can be effected by any appropriate method, the following modes of operational control have been found to be suitable in the practice of the present invention.

Mode I.

1. Two-phase mixture supply

A differential-pressure gauge 13 for monitoring the slurry level (height of fluid surface 15) is installed to confront the upper-layer slurry phase 1 and intercoupled with a control valve 5 for controlling the flowrate of supply of the mixture of the two phases through the inlet 4 thereby to control the supply rate so as to maintain the slurry-phase surface 15 at a constant level.

2. Slurry product extraction

Slurry as a product is discharged at a constant rate through draw-off pipe line 9 connected to the slurry recirculation line 8 as indicated in FIG. 1.

3. Aqueous phase discharge

In the case of an overflow-type draw-off means, the aqueous phase is automatically drawn off in a manner to maintain the interface 14 at a constant level when the height of the top of the overflow pipe 11 is determined. When an overflow means is not used the aqueous phase is drawn off as control is exercised through the use of a differential-pressure level gauge to maintain the slurry-phase surface 15 at a constant level.

Mode II.

1. Two-phase mixture supply

The mixture of the two phases is supplied at a constant flowrate through the supply inlet 4.

2. Slurry product extraction

The slurry product is discharged as control is exercised to maintain the slurry surface 15 at a constant level.

3. Aqueous phase draw-off

In the case of an overflow-type draw-off means, the aqueous phase is automatically drawn off in a manner to maintain to interface 14 at a constant level when the height of the top of the overflow pipe 11 is determined. When an overflow means is not used, the aqueous phase is drawn off as control is exercised through the use of a differential-pressure level gauge to maintain the slurry-phase surface 15 at a constant level.

One specific example of a practical separation chamber of tower type according to the present invention is illustrated in FIG. 2, in which the same reference numerals as those used in FIG. 1 respectively designate the same or like parts. As shown, the lower part of the chamber containing the aqueous phase is of a diameter (of the order of 2,800 mm. inner diameter) greater than that (of the order of 2,200 mm. inner diameter) of the upper chamber part holding the slurry phase. The height of the separation chamber from top to bottom end plate is of the order of 10,500 mm., and the height of the smaller-diameter upper part is of the order 6,000 mm. The principal structural parts of this chamber are made of stainless steel.

This separation chamber has three slurry draw-off outlet nozzles 6. The region of the chamber of smaller diameter containing the slurry phase and the upper part of the aqueous phase is provided therearound with a hot water jacket 17 having a hot water inlet nozzle 18 and a hot water outlet nozzle 19. The baffle plate 12 is of the bent shape shown and extends laterally from wall to wall. The upper and middle parts of the chamber are provided with liquid level gauges 20 and 21, respectively, for observing the levels of the slurry-phase surface and the interface between the two phases.

The separation chamber is further provided with auxiliary and spare nozzles, some of which are for various instruments and gauges, a safety valve, a drain at the lowest part of the bottom, and other parts, all of which are not shown because they are not essential elements of the present invention.

The method and apparatus of the invention can be generally applied to the separation of mixtures in each of which, upon being left standing at rest, an oil slurry phase disposed as an upper layer and an aqueous phase disposed as a lower layer exist. Provided that this condition is satisfied, the "oil" slurry phase may contain a small quantity of a water-soluble solvent as, for example, a few percent of an alcohol, and even when the specific gravity of the dispersed phase itself is greater than one (unity), this invention can be applied as long as the "oil slurry phase" is disposed above the "aqueous phase".

The aqueous phase, also, in addition to being pure water, may contain as a solute a water-soluble substance as, for example, an alkali such as ammonia or an alkali hydroxide, a salt such as an alkali halide, or an alcohol. While it is desirable that this aqueous phase be a homogeneous liquid not containing matter such as solids and tacky substances, the aqueous phase may contain such substances provided the general spirit and principle of the invention are adhered to. That is, for example, the aqueous phase may contain solid substances to an extent such that it still may be considered to be a substantially homogeneous liquid.

A specific example of such a mixture is observable in the production of an olefin polymer by slurry polymerization in which a so-called Ziegler type catalyst is used. More specifically, a slurry in which an insoluble polyolefin (particle size of the order of from 1 to 3 mm.) such as a polyethylene or a polypropylene is suspended in a hydrocarbon or a halo hydrocarbon of a specific gravity less than one (unity), e.g., from 0.6 to 0.8 used singly or a mixture is first produced. Examples of the hydrocarbon or halo hydrocarbon are pentane, hexane, heptane octane, decane, dodecane, benzene, toluene, xylene, and chlorobenzene. The concentration of the dispersed phase, i.e., polyolefin concentration within the slurry is of the order of from 5 to 40 percent by weight.

Thereafter, in order to break down the active catalyst or to remove the catalyst residue, a process step of treating this slurry with a liquid such as an alcohol, water, or an aqueous solution of an alkali is carried out, whereupon a mixture which is of a nature suitable for application of the invention is formed. The slurry which has been separated according to the invention is subjected to a further process such as further removal of admixed aqueous phase in accordance with the necessity and then sent to process steps such as recovery of lefin polymer.

In order to indicate still more fully the nature and utility of the invention, the following example of practice constituting a preferred embodiment of the invention is set forth, it being understood that this example is presented as illustrative only and that it is not intended to limit the scope of the invention.

EXAMPLE

A mixture composed of 100 parts of polypropylene in powder form, 200 parts of heptane for industrial use, and three parts of an alcohol (all parts being by weight) was separated into a slurry phase and an aqueous phase (an aqueous solution of the alcohol) by means of an apparatus which was essentially the same as that illustrated in FIG. 1. The separation chamber 16 of this apparatus was of an overall height of 4,500 mm. a diameter in the vicinity of the two-phase mixture supply inlet 4 of 500 mm., and a diameter from the top to a level 3,700 mm. therebelow of 210 mm., and the height of the overflow pipe (corresponding to pipe 11) was 3,200 mm. A level gauge of differential pressure type was installed in the chamber at a part thereof containing the slurry phase.

Slurry, as a product, was drawn off through a slurry discharge pipe line (corresponding to pipe line 9 in FIG. 1) at a constant flowrate of 215 liters/hour, while the aqueous phase was discharged in a natural manner through the overflow pipe.

The height level of the slurry-phase surface 15 was maintained constant at 3,700 mm. by a differential-pressure level gauge (corresponding to gauge 13) and a supply control valve 5 coupled thereto to operate in response thereto. After dynamic equilibrium was attained, the interface 14 between the two phases was maintained at a level of 1,700 mm., the slurry draw-off outlet 6 then being 1,000 mm. above and the two-phase mixture supply inlet then being 1,300 mm. below the interface level.

The slurry recirculation flowrate was 1,000 liters/hour, which corresponds to approximately 14.5 times the quantity of the residence or retained slurry. The mixture supply pipe line downstream from the supply control valve 5 was formed with a divergent flare, whereby the diameter thereof at the supply inlet was 100 mm. (4 inches).

During the operation of the apparatus under the conditions as described above, the average rate of supply of the mixture of the two phases was 315 liters/hour. It was found that during this operation no slurry (heptane and polypropylene) was admixed with the discharged aqueous phase, and, moreover, only 0.05 percent of water was detected in the slurry product, whereby it could be concluded that the separation of the slurry and aqueous phases was thorough. Furthermore, there was no instance of malfunctioning of the apparatus or misoperation of the process during one week of continuous operation.

We claim:

1. In the separation of a slurry from a mixture of an oil slurry phase and an aqueous phase which stratify into a respective and contiguous oil slurry phase and an aqueous phase when said mixture is left standing at rest, the method which comprises: introducing a mixture of an oil slurry phase and an aqueous phase continuously into a tower-type separation chamber; retaining the mixture for a certain time in said chamber to stratify into an oil slurry phase and an aqueous phase; and continuously drawing off slurry from the upper part of said separation chamber and, at the same time, aqueous phase from the lower part of said separation chamber at a rate to maintain a state of dynamic equilibrium within the chamber as a portion of the slurry thus drawn off is continuously discharged as a slurry product, and continuously recirculating the remaining portion of said slurry drawn off into the oil-slurry phase within the chamber.

2. A method for continuously separating slurry as claimed in claim 1, in which said mixture is introduced continuously into said separation chamber at a flowrate effective to maintain constant the level of the free surface of the slurry phase within the chamber.

3. A method for continuously separating slurry as claimed in claim 1, including detecting a differential pressure existing between a level of the slurry phase and the mixture being introduced into said chamber, and introducing the mixture continuously at a flowrate in dependence upon said differential pressure to maintain constant the level of the free surface of the slurry phase within the chamber.

4. A method for continuously separating slurry from a mixture of a lighter oil slurry phase and a heavier aqueous phase which mixture is the result of an aqueous treatment of an olefin polymer slurry derived from a slurry polymerization process, comprising the steps of: introducing said mixture continuously into a tower-type separation chamber; retaining the mixture to be retained for a certain time in said chamber to stratify into said oil slurry phase and said aqueous phase; and continuously drawing off slurry from the upper part of said chamber and, at the same time, aqueous phase from the lower part of said chamber at a rate to maintain a state of dynamic equilibrium within the chamber as a portion of the slurry drawn off is continuously discharged as a slurry product, and continuously recirculating the remaining portion of said slurry drawn off into the oil-slurry phase within the upper part of the chamber.

5. Apparatus for continuous slurry separation comprising:
   1. a tower-type separation chamber of vertically elongated shape comprising a supply inlet for continuously supplying into said chamber a mixture of an oil slurry phase and an aqueous phase, which thereupon form in the chamber a contiguous oil phase slurry and aqueous phase with an interface therebetween, said oil slurry phase having a free upper surface spaced apart from the upper end of the chamber, at least one slurry drawoff outlet disposed at a height level between said free upper surface and said interface, an aqueous phase drawoff outlet disposed near the bottom of the chamber, and means comprising a flow-control device responsive to the level of the free upper surface to control the rate of supply of said mixture to maintain constant the level of said surface;
   2. slurry recirculation means for continuously drawing off slurry from the chamber through said at least one slurry drawoff outlet and returning the same to the chamber through an upper end thereof;
   3. slurry discharge means connected to said at least one slurry drawoff outlet for continuously discharging slurry as a product, and
   4. means to control the rates of supply of the mixture, of the recirculation of slurry, of the discharge of the slurry product, and of the drawoff of the aqueous phase interrelatedly to maintain a state of dynamic equilibrium within the chamber, whereby the levels of the slurry free surface and interface are respectively maintained substantially constant.

6. Apparatus as claimed in claim 5, including a baffle plate interposed between said supply inlet and said aqueous phase drawoff outlet, a hot water jacket enclosing the outer surface of said chamber over at least the region thereof from the level of said slurry free surface to the level of said interface, and the cross-section area of the chamber in a region containing the aqueous phase being greater than the cross-section area in a region containing the slurry phase.

7. Apparatus as claimed in claim 5, in which
   the distance between said slurry free surface and the upper end of the chamber is in the order of one meter;
   the distance between said interface and said slurry drawoff outlet being in the order of at least 0.3 meter;
   the distance between the interface and said supply inlet being in the order of at least 0.5 meter;
   the slurry drawoff outlet being dimensioned to pass a flowrate of slurry drawn off equal to from five to 100 times the volume of the upper-layer slurry phase within the chamber per hour.

8. Apparatus as claimed in claim 5, in which said slurry discharge means is connected to a part of said slurry recirculation means to divert a portion of the slurry drawn off from the chamber by said recirculation means to discharge said portion as the slurry product.

* * * * *